US011134712B2

(12) United States Patent
Nelson et al.

(10) Patent No.: US 11,134,712 B2
(45) Date of Patent: Oct. 5, 2021

(54) ADJUSTABLE BREADING MACHINE AND METHOD OF OPERATION

(71) Applicant: MP Equipment, LLC, Gainesville, GA (US)

(72) Inventors: Rodney Nelson, Suwanee, GA (US); Matt Palmer, Cleveland, GA (US); Antonio Munoz, Gainesville, GA (US); Brian Hopper, Jefferson, GA (US)

(73) Assignee: MP EQUIPMENT LLC, Gainesville, GA (US)

( * ) Notice: Subject to any disclaimer, the term of this patent is extended or adjusted under 35 U.S.C. 154(b) by 0 days.

(21) Appl. No.: 16/407,469

(22) Filed: May 9, 2019

(65) Prior Publication Data

US 2020/0046012 A1 Feb. 13, 2020

Related U.S. Application Data

(60) Provisional application No. 62/716,139, filed on Aug. 8, 2018.

(51) Int. Cl.
*A23P 20/13* (2016.01)
*A23G 3/20* (2006.01)
(Continued)

(52) U.S. Cl.
CPC ............ *A23P 20/13* (2016.08); *A23G 3/2076* (2013.01); *A23G 3/26* (2013.01); *A23L 13/03* (2016.08); *A23L 13/57* (2016.08); *B05C 3/08* (2013.01)

(58) Field of Classification Search
CPC .......... A23L 13/57; A23L 13/03; A23P 20/13; A23P 20/12; A23G 3/2076; A23G 3/26;
(Continued)

(56) References Cited

U.S. PATENT DOCUMENTS 3,102,052 A 8/1963 Ackles
3,735,726 A 5/1973 Butler
(Continued)

FOREIGN PATENT DOCUMENTS

EP 1 658 777 A1 5/2006

OTHER PUBLICATIONS

International Search Report and Written Opinion dated Oct. 29, 2019 for PCT Application No. PCT/US19/45428, 9 pages.

*Primary Examiner* — Laura Edwards
(74) *Attorney, Agent, or Firm* — Barnes & Thornburg LLP

(57) ABSTRACT

An adjustable breading machine for applying a coating material onto a food product, the machine includes a frame and a breading chamber enclosure through which the food product travels along the food path to receive a coating material. The adjustable breading machine may also include a hopper fixedly connected to the frame to deliver a coating material into the breading chamber enclosure. At least partially within the breading chamber enclosure is a main conveyor and an outfeed conveyor. In a first mode of operation, the outfeed conveyor lies in the food path and receives food product from the main conveyor. The adjustable breading machine includes a drum assembly operatively disposed above the outfeed conveyor having a rotatable drum for transporting food product and coating material to the outfeed conveyor. The adjustable breading machine also includes a drum adjustment assembly for moving the drum assembly between modes of operation.

20 Claims, 13 Drawing Sheets

(51) Int. Cl.
 *A23G 3/26* (2006.01)
 *B05C 3/08* (2006.01)
 *A23L 13/50* (2016.01)
 *A23L 13/00* (2016.01)

(58) Field of Classification Search
 CPC .......... B05C 19/00; B05C 19/06; B05C 3/05; B05C 3/08
 USPC .... 118/13, 16, 19, 24, 26, 30, 57, 417, 418; 99/494
 See application file for complete search history.

(56) References Cited

U.S. PATENT DOCUMENTS

| | | | |
|---|---|---|---|
| 3,739,743 A | 6/1973 | McKee, Jr. |
| 4,497,244 A | 2/1985 | Koppens |
| 5,020,427 A | 6/1991 | Kennefick et al. |
| 5,052,330 A | 10/1991 | Stacy |
| 5,226,354 A | 7/1993 | Stewart |
| 5,236,502 A | 8/1993 | Wadell |
| 5,238,493 A | 8/1993 | Miller |
| 5,284,514 A | 2/1994 | Griffiths |
| 5,514,399 A | 5/1996 | Cordera et al. |
| 5,643,361 A | 7/1997 | Wadell |
| 5,664,489 A | 9/1997 | Herrick, IV |
| 5,707,448 A | 1/1998 | Cordera et al. |
| 5,937,744 A | 8/1999 | Nothum, Sr. et al. |
| 6,158,332 A | 12/2000 | Nothum, Sr. et al. |
| 6,258,332 B1 | 7/2001 | Johnson et al. |
| 6,658,993 B2 | 12/2003 | Kuenen |
| 6,694,914 B2 | 2/2004 | Kuenen |
| 6,698,379 B2 | 3/2004 | Van Duijnhoven et al. |
| 7,017,321 B2 | 3/2006 | Salvoni |
| 7,398,875 B2 | 7/2008 | Niesar |
| 7,413,070 B2 | 8/2008 | Mayer |
| 7,418,920 B2 | 9/2008 | Kuenen |
| 7,523,698 B2 | 4/2009 | Boogers |
| 8,020,690 B2 | 9/2011 | Asma |
| 8,127,667 B2 | 3/2012 | Kastenschmidt et al. |
| 8,302,760 B2 | 11/2012 | Cuypers |
| 8,415,592 B2 | 4/2013 | Kuenen |
| 8,448,569 B2 | 5/2013 | Kastenschmidt et al. |
| 8,741,367 B2 | 6/2014 | Van Gerwen et al. |
| 8,857,604 B2 | 10/2014 | Heber et al. |
| 8,863,686 B2 | 10/2014 | Ris |
| 9,011,953 B2 | 4/2015 | Kowalik et al. |
| 9,061,840 B2 | 6/2015 | Gahler |
| 9,119,403 B2 | 9/2015 | Van Gerwen |
| 9,162,375 B2 | 10/2015 | Van Gerwen |
| 9,637,365 B2 | 5/2017 | Van Gerwen |
| 9,828,190 B2 | 11/2017 | Gahler |
| 2006/0107893 A1 | 5/2006 | Kuenen |
| 2006/0156931 A1 | 7/2006 | Mather et al. |
| 2007/0264397 A1 | 11/2007 | Mather et al. |
| 2008/0241269 A1* | 10/2008 | Velasquez ............ A23L 3/3463 424/520 |
| 2016/0192696 A1 | 7/2016 | Sprinkle et al. |

* cited by examiner

ADJUSTABLE BREADING MACHINE AND METHOD OF OPERATION

This application claims the benefit of priority under 35 U.S.C. § 119(e)(1) of U.S. Provisional Application Ser. No. 62/716,139, filed Aug. 8, 2018, the entire contents of which are incorporated herein by reference.

FIELD OF INVENTION

The present invention relates to food processing equipment and methods, for the coating or breading of food products. More particularly, certain embodiments of the present invention relate to a coating machine and methods for dispensing a coating material (e.g., flour, breadcrumbs, cracker meal) onto food products, such as in large-scale food processing lines.

BACKGROUND OF THE INVENTION

In the industry of high volume production of food products, it is desirable to coat certain food products (e.g., chicken) with, for example, batter and a breading material before cooking the food products. Breading material may include a relatively dry material such as fine particle flour breading, Japanese-style breadcrumbs having a large distribution of breadcrumb sizes, cracker meal of differing particle sizes, or many other types of coating materials. Each type of breading or coating material has its own characteristics that cause the breading material to react in differing ways when being distributed within a breading or coating machine and onto food products.

Automated breading machines for applying breading and various types of coatings, including flour, to food products for mass production have been manufactured since the late 1940's. The original machines were for coating products such as fish sticks, fish portions, shrimp, and some poultry products. With a major growth in coated or breaded foods including onion rings, fish sticks, nuggets, shrimp, meat patties, and a full variety of chicken nuggets, tenders, wings, etc., breading machine design has changed to accommodate the wide variety of food products. Coated food products are used in mass quantities in retail grocery stores, food service (e.g., schools), and quick service restaurants.

Coating material originally was primarily dried breadcrumbs, being granular in nature, and what is considered to be a free flowing type of material. Over the years the coatings have turned more to spiced flour, which has required manufacturers of coating machines to redesign the machines to handle these flour-type coatings, which are not considered to be free flowing. For example, if one picks up a hand full of flour and squeezes it, the flour compacts and balls up. On the other hand, a granular type of coating material does not compact when squeezed but, instead, will sift through your fingers, similar to granular salt or sugar.

Today, there is a new variety of spiced flour coating that is applied in a heavy texture called home-style. It is built up of wet batter and flour that is applied in multiple stages. Along with new coatings, process line capacity has grown from the two or three thousand pounds per hour to eight to ten thousand pounds per hour and more. Process line durability and coating material control is more critical today than ever. Additionally, food safety standards require sanitary designs, and the machines must be safe to operate.

Certain difficulties with respect to traditional breading machines also include applying the breading material evenly over the food products, preventing clogging or bridging of the breading material within the breading machine, and eliminating clumping of the breading material within the breading machine. For example, many breading machines use a breading system where breading is distributed onto a conveyor to form a bottom coating layer, and to the tops of food products as they travel through the machine on the conveyor. This is effective for only certain types of breading, including flour, crumb, and meal-based breading. For other types of breading, the breading will only be sufficiently applied upon use of a further mechanism, like a drum. A drum is desirable in some instances where the breading does not stick in the first instance, and additional breading material must be applied to the food product in the drum.

Some examples of known breading machines will be discussed with respect to FIGS. 1A-D and 2A-B. In particular, FIGS. 1A-D illustrates several views of a first embodiment of a known breading or coating machine 100 as described in U.S. Patent Application Publication No. 2007/0264397, the entire contents of which are incorporated herein by reference. The breading machine 100 includes an input side 110 and an output side 120. Food products to be coated with a coating material (e.g., flour, breadcrumbs, cracker meal) enter the breading machine 100 on the input side 110 and exit on the output side 120. The food products are typically fed into the input side 110 via a conveyor belt, for example, such as from prior equipment, such as a batter applicator. The food products are coated in the machine 100 and are typically fed out of the output side 120 and into, for example, a baking oven or fryer (not shown). The volumes of food products processed in this way are significant, and may be on the order of 10,000 pounds per hour or more, requiring significant amounts of coating materials, and distribution onto all of the food products passing therethrough in a uniform and desired manner. The breading characteristics desired for various food products, including the type of breading, thickness and other characteristics, must be achieved by a single machine for efficiency, and the ability to effectively control such parameters provides the user with a great amount of flexibility. The ability to control the function of the machine in these ways also allows the user to fashion the most cost effective coating process, while not sacrificing desired final product characteristics, such as by effective control of breading thickness. The machine 100 further provides low-pressure handling of the breading materials within the machine to improve breading characteristics on the coated products.

The breading machine includes several sections including a top hopper 130, a top hopper feed chute 135, a vertical breading transport section 140, a first horizontal breading transport section 150, and a second horizontal breading transport section 160. The breading machine 100 also includes a coating transfer box 155, a side-feed hopper 170, a crumb filter assembly 180, and a top coating spreader assembly 190. The transport sections 140, 150, and 160 include screws or augers to transport the coating material through various parts of the breading machine 100.

The machine 100 has a main endless food productbreading conveyor belt 196 running through several sections 191-195 of the breading machine 100. These sections 191-195 form a breading chamber enclosure. The conveyor belt 196 carries food products and coating material through the breading chamber enclosure via an upper forward path of the belt 196. Unused coating material is fed back and recirculated through the breading machine via a lower return path of the belt 196. The food products enter the breading machine 100 at the input side 110 without being coated, and exit via the output side 120 after having been coated by the breading machine.

FIGS. 2A-B illustrate two views of a second embodiment of a known breading machine 200 as described in U.S. Patent Application Publication No. 2007/0264397, the entire contents of which are incorporated herein by reference. The design of this second embodiment is very similar to the design of FIGS. 1A-D. However, in this second embodiment, a side-mounted feed hopper 210 is mounted on the opposite side of the breading machine 200 as compared to FIGS. 1A-D. This mounting provides flexibility in positioning the machine in a processing line adjacent other equipment. A vertical screw 215 can be seen within the vertical breading transport section 220. The breading machine 200 includes a first horizontal breading transport section 240, and a second horizontal breading transport section 230. A horizontal cross-feed screw 245 can be seen within the horizontal breading transport section 240.

The breading machine 200 also includes a top hopper 250, a spreader assembly 255, a filter assembly 260, and a main breading conveyor belt 265. The breading machine 200 has an input end 270 and an output end 280 for food products to enter and exit.

Similarly, if a user would like to coat different food products in different breading types, it is possible that one would need multiple breading machines to accommodate the different breading types. For example, a flour-type mixture may more readily coat food product merely by covering the top by sprinkling and the bottom as the product sits on the coated conveyor. However, more granular coating materials, like breadcrumbs, may require additional processes, like compression rollers or drums. Thereby, a user may be required to house and maintain several breading machines to effectively process different types of breading. It would therefore be desirable to provide a breading machine that can accommodate different breading modes and processes.

Nowadays, it is known that rotary drums can facilitate the breading of certain food products. However, rotary drums present several issues in and of themselves. For instance, it is common that when the food product reaches the end of the drum, the food product sticks to the upper inner surface of the drum. This is problematic because the food product proceeds to fall from the top of the drum to the below conveyor potentially damaging the food product or resulting in a food product with non-uniform breading. Therefore, it would be desirable if there was an adapter provided at the output end of the drum to safely transfer food product from the drum to the conveyor.

Another issue with rotary drums in breading machines is that the drums channel the food products into single-file lines as the food product exits the drum. In many instances, it is desirable for the food product to be randomly, or evenly, spread across the conveyor after it exits the drum. This is so because the next stage of the processing of the food product may include, for example, deep-frying or batter application. If the food products are not sufficiently spaced from one another, there is a risk that the food products could stick together in a deep fryer, for example. It would be desirable to provide a drum, or an adapter to a drum, that can evenly spread food product across the conveyor.

Other problems with known breading machines relate to the footprint of the breading machine. Currently, the length of the breading machine varies for each type of breading process. This results in changing the overall length of the breading machine for each breading process, and in some case, increasing the footprint on the plant floor. It would therefore be desirable to provide a breading machine that shortens the overall length of the machine and has a constant footprint as the functions of the breading machine changes.

Another downfall of existing breading machines capable of operating with rotary drums is the inefficient transition to or from drum mode. Currently, breading machines require insertion of a drum cartridge or unit into or removal of a drum cartridge or unit from the heart of the breading chamber. To insert or remove such a rotary drum unit, the entire food processing line must be shut down Naturally, the longer the line is shut down the less food products are generated resulting in production inefficiencies. It would be desirable to provide a breading machine that does not require the complete shut down of the production line to change operating modes.

Additionally, if a machine requires a removable drum unit, when not in use, the drum unit must be stored elsewhere. The rotary drum units may be particularly sizable and heavy, thereby, requiring sufficient storage space and additional machinery to remove or insert such a unit. Further still, upon removal and prior to insertion, the rotary drum assembly must be sanitized or cleaned. As such, it would be desirable to provide a breading machine that always houses the rotary drum unit.

Further limitations and disadvantages of conventional, traditional, and proposed approaches will become apparent to one of skill in the art, through comparison of such systems and methods with the present invention as set forth in the remainder of the present application with reference to the drawings.

SUMMARY

A first aspect of the present invention regards an adjustable breading machine for applying a coating material onto a food product, the adjustable breading machine includes a frame, an enclosure defining a breading chamber operatively connected to the frame, and a main convevor operatively received at least partially within the breading chamber. The main conveyor including a first main conveyor end and a second main conveyor end, wherein the main conveyor is adapted to move with respect to the breading chamber. The adjustable breading machine further including a hopper fixedly connected to the frame to deliver a coating material into the breading chamber and an outfeed conveyor operatively received at least partially within the breading chamber. The outfeed conveyor including a first outfeed conveyor end and a second outfeed conveyor end, wherein the outfeed conveyor is adapted to move with respect to the breading chamber. A drum assembly is operatively disposed above the outfeed conveyor, the drum assembly including a rotatable drum for transporting food product and coating material to the outfeed conveyor, wherein the rotatable drum is rotatable about a drum longitudinal axis. The adjustable breading machine further including a drum adjustment assembly operatively connected to the frame for moving the drum assembly into and out of a food path.

A second aspect of the present invention regards a method for operating an adjustable breading machine that includes providing an adjustable breading machine having a frame, a main conveyor, a breading hopper attached to the frame, an outfeed conveyor, a drum assembly operatively disposed above the outfeed conveyor, and a drum adjustment assembly for moving the drum assembly into and out of a food path. The method also includes metering a coating material onto the main conveyor using the breading hopper, placing a food product onto the main conveyor belt, and adjusting the adjustable breading machine using the drum adjustment assembly from a first mode, wherein the drum assembly is substantially disposed in the food path, to a second mode, wherein the outfeed conveyor is substantially disposed in the food path, or vice versa.

These and other advantages and novel features of the present invention, as well as details of an illustrated embodiment thereof, will be more fully understood from the following description and drawings.

DETAILED DESCRIPTION

Figure 3:
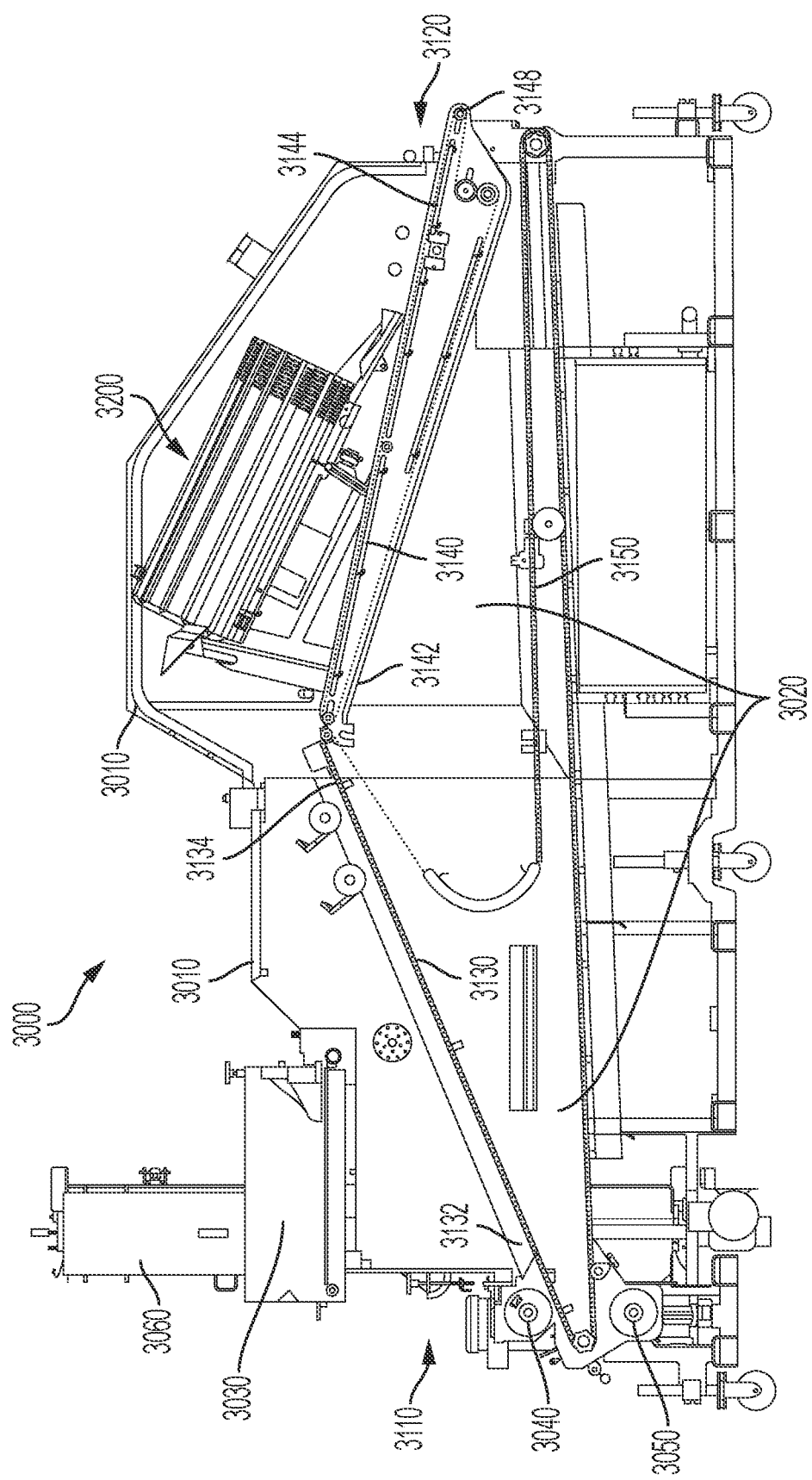
FIG. 3 is a side cross-sectional view of a third embodiment of a breading machine in flat mode, in accordance with the present invention.

FIGS. 3-13 show a breading machine 3000 that is adjustable. In some aspects, the adjustable breading machine 300X) operates in the same general manner as the breading machine 100 of FIGS. 1A-D in that food product enters the breading machine at an input side 3110 and exits the machine 3000 at an exit side 3120. The adjustable breading machine 3000 includes a main conveyor 3130 that carries food products and coating material through a breading chamber enclosure 3010. Food product is placed on the top surface of the inclined main conveyor 3130 by an upstream conveying equipment, such as a batter applicator, in a manner similar to described in U.S. Patent Application Publication No. 2007/0264397, the entire contents of which are incorporated herein by reference. Also, the coating material is placed on the top surface of the inclined main conveyor 3130 and the food product by an auger 3040 that received the coating material from a hopper 3030 in a manner similar to that described in U.S. Patent Application Publication No. 2007/0264397, the entire contents of which are incorporated herein by reference. The main conveyor 3130 is fixedly attached to the frame 3020 of the breading machine 3000 as shown in FIG. 3 and driven by a motor (not shown). The motor may be attached to a belt or gears that drive a series of gears or sprockets. The main conveyor 3130 may be supported by a pan with a belt for carrying the food product and coating materials. Other configurations for transporting products that are commonly used in industrial food processing may be used as well and are contemplated in this disclosure, for example, a series of rollers, drive shafts, or in-line belt tension systems.

As shown in FIG. 3, the main conveyor 3130 carries the food product upwardly in a forward path. The upwardly forward path begins at a first main conveyor end 3132 and continues upward to the second main conveyor end 3134 carrying the food product and the coating material. The inclined main conveyor 3134 is particularly desirable because it not only shortens the overall length of the breading machine 3000, thereby, decreasing the breading machine's footprint on the factory floor, but it also carries the food product to a height whereat the food product can pass through a drum assembly 3200 (see FIG. 4) using gravity instead of requiring a conveyor or the like, as will described in further detail below. It is contemplated, however, that the main conveyor 3130 operates in a substantially horizontal configuration or at another desirable pitch or angle.

In one mode of operating the adjustable breading machine 3000, called flat mode, as shown in FIG. 3, when the food product and coating material are at or near the second main conveyor end 3134, an outfeed conveyor 3140 is substantially disposed in the food path such that the food product and coating material from the second main conveyor end 3134 transfer to the first outfeed conveyor end 3142 of the outfeed conveyor 3140. Flat mode may also be known as, inter alia, flatbread mode or in-line breading mode. Alternatively, and as shown in FIG. 4, the adjustable breading machine 3000 may be in another mode, called drum mode or home-style mode, wherein the drum assembly 3200 is substantially disposed in the food path such that the food product and coating material from the second main conveyor end 3134 transfers to the three drums 3210a-c of the drum assembly 3200.

As shown in FIG. 3, when the adjustable breading machine is in flat mode, the outfeed conveyor 3140 is oriented in a downward fashion with respect to the frame 3020 and the second main conveyor end 3134 such that the food product is carried via a downward forward path. The downward forward path begins at the first outfeed conveyor end 3142 and continues downward to the second outfeed conveyor end 3134 as shown in FIG. 3. As shown in FIG. 3, the outfeed conveyor 3140 is fixedly attached to the frame 3020 of the breading machine 3000 and driven by a motor (not shown). In some embodiments, the motor used to drive the outfeed conveyor 3140 may also be used to drive the main conveyor 3130. The outfeed conveyor 3140 may be supported by a pan with a belt for carrying the food product and coating materials. Other suitable configurations for transporting products that are commonly used in industrial food processing may be used as well and are contemplated in this disclosure, for example, a series of rollers, drive shafts, and in-line belt tension systems.

Figure 4:
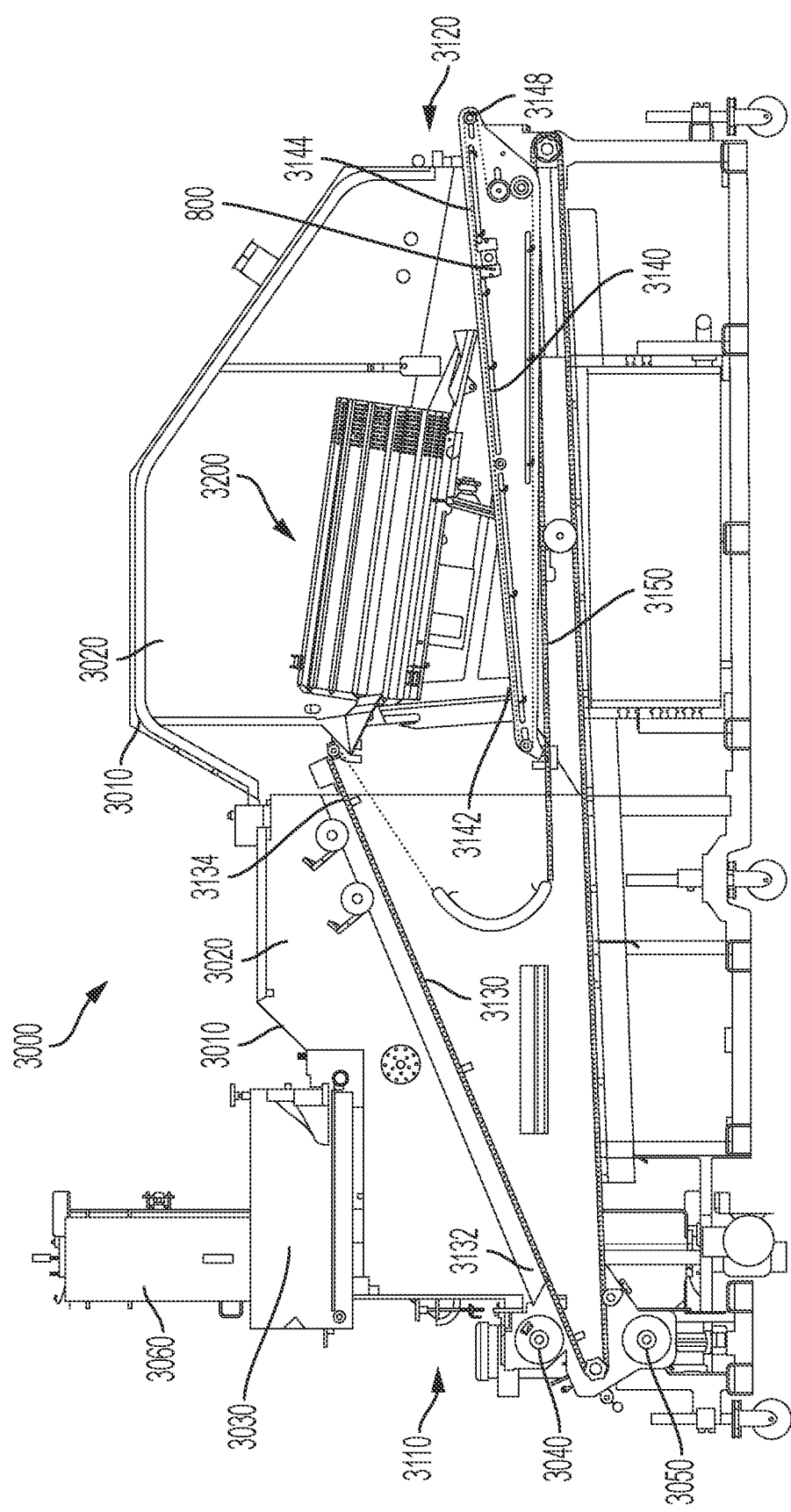
FIG. 4 is a side cross-sectional view of the breading machine of FIG. 3 in drum mode.

As shown in FIGS. 3 and 4, a recirculation conveyor 3150 operatively attached to the frame 3020 passes underneath the outfeed conveyor 3140 such that the recirculation conveyor 3150 collects the unused coating material that passes through openings formed in the outfeed conveyor 3140. It is contemplated that the outfeed conveyor 3140, in some embodiments, has a mesh or grated belt such that unused or excess coating materials may pass through to the recirculation conveyor 3150. FIGS. 3 and 4 depict the recirculation conveyor 3150 as a part of the main conveyor 3130 in that the recirculation conveyor 3150 is the lower return path of the main conveyor 3130. The unused coating material is transported by recirculation conveyor 3150 to a second auger 3050, which circulates the unused coating with the new coating material and to a vertical auger 3060 which loads hopper 3030 in a manner similar to that described in U.S. Patent Publication No. 2007/0264397, the entire contents of which are incorporated herein by reference.

Figure 5:
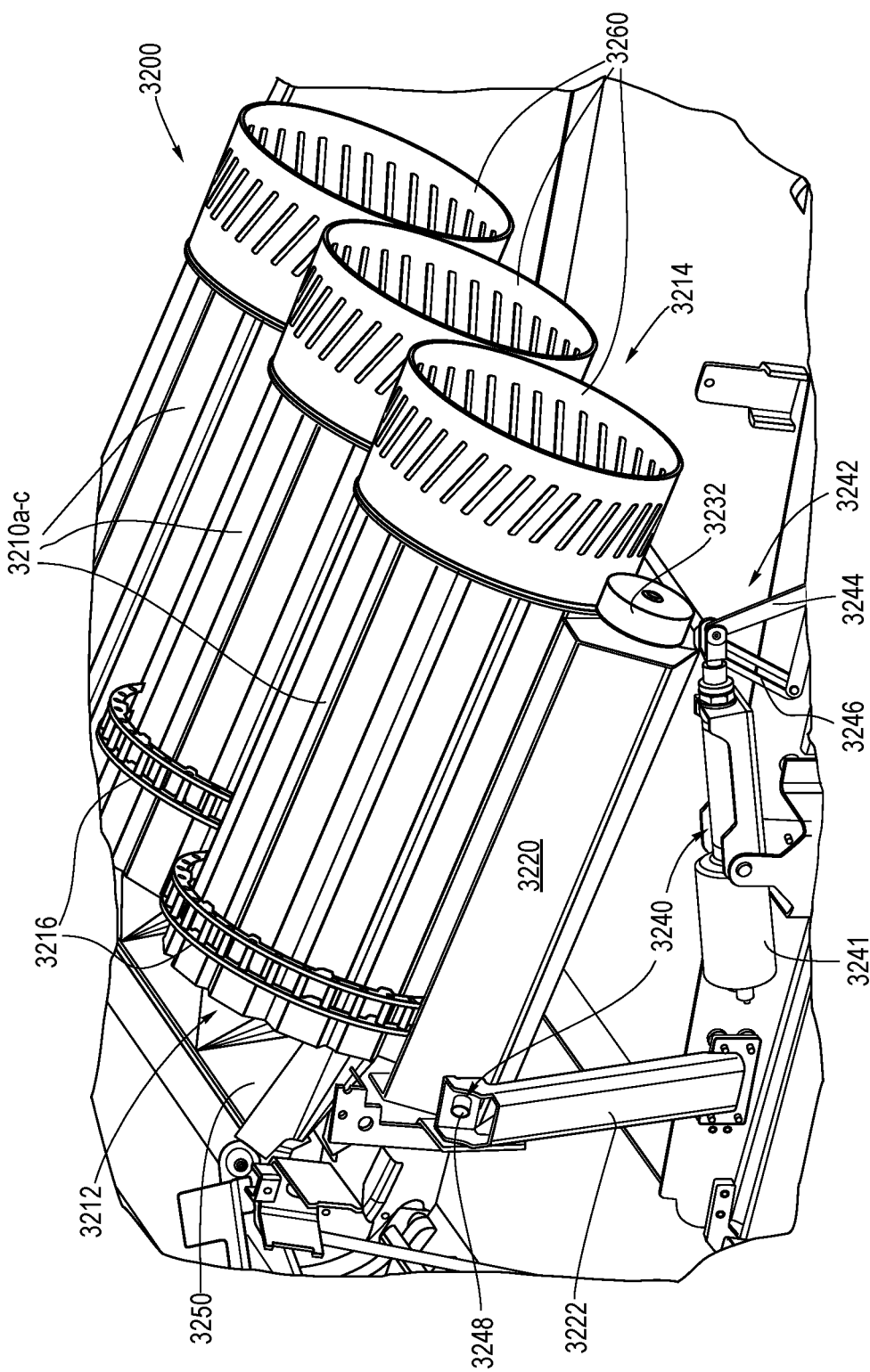
FIG. 5 is a right perspective view of an embodiment of a drum assembly to be used with the breading machine of FIG. 3.

FIG. 3 also shows the adjustable breading machine 3000 includes the drum assembly 3200 located above the outfeed conveyor 3140 when in flat mode. The drum assembly 3200 attaches to the outfeed conveyor 3140 via a drum assembly frame 3220. As shown in FIG. 5, the drum assembly frame 3220 attaches to the outfeed conveyor 3140 via brackets 3222. The brackets 3222 may secure to the outer edges of the outfeed conveyor 3140 such that the drum assembly frame 3220 does not interfere with the food product and coating materials. It is contemplated that the drum assembly 3200 may attach to the outfeed conveyor 3140 and be supported by various other attachment mechanisms, for example, a truss. The drum assembly frame 3220 maintains an adequate distance between the top surface of the outfeed conveyor 3140 and the bottom of the drum assembly frame 3220 such that food products and coating material on the outfeed conveyor 3140 may pass underneath the drum assembly frame 3220 in flat mode, as shown in FIG. 3.

As shown in FIG. 5, the drum assembly 3200 includes three drums 3210*a*-*c*. Each of the drums 3210*a*-*c* has a drum front end 3212 and a drum back end 3214. Each drum 3210 is a substantially cylindrical tube; however, other geometries may be used. For example, each drum may be frustoconical. Each drum can be formed from sheet metal, like stainless steel. In the embodiment shown in FIG. 5, each drum 3210*a*-*c* is formed from corrugated sheet metal. The drums 3210*a*-*c* may be formed from other suitable metals or plastics for use with food products.

It is contemplated that the inner surface of each drum 3210*a*-*c* may be textured to include ridges or indentations in the surface. Patterns on the inner surface of the drums 3210*a*-*c* facilitate efficient coating of the food product because the inner surface pattern may correlate to the amount of time it takes for the food product to pass through the drums 3210*a*-c. For example, if the corrugations in the corrugated sheet metal forming the drums 3210*a*-*c* are large, the food product may be tossed in the drum for a longer duration.

Additionally, texturing of the surface may be desirable to change the orientation or direction of the food product as it passes from the main conveyor 3130 to the outfeed conveyor 3140 while operating in drum mode shown in FIG. 4. Alternatively, the ridges or indentations may spiral around the inner surfaces of the drums 3210*a*-*c*, for example, like a helix or a barrel on a rifle, to move or orient the food product and coating material in a predetermined direction. In some embodiments, it is contemplated that paddles or fins may be disposed on the inner surfaces of the drums 3210*a*-*c*. The ridges, corrugations, indentations, fins, or the like contemplated in this disclosure, may span the lengths of the drums 3210*a*-*c* or only through a portion of their lengths. In other embodiments, the ridges or indentations may extend straight along the longitudinal axes of the drums 3210*a*-*c*. In embodiments where a suitable metal is used to construct the drums 3210*a*-*c*, the inner surface may be polished or machined with a desirable finish to allow the food product to smoothly exit the drum 3210.

In some embodiments, the drums 3210*a*-*c* are rotatable about corresponding drum longitudinal axes extending the lengths of the drums 3210*a*-*c* from the drum front end 3212 to the drum second end 3214. The rotatable drums 3210*a*-*c* are driven by a drum motor 3230 that engages the drums 3210*a*-*c*. The drum motor 3230 may drive the drums 3210*a*-*c* in a clockwise or counterclockwise direction depending on a user's preference.

Figure 6:
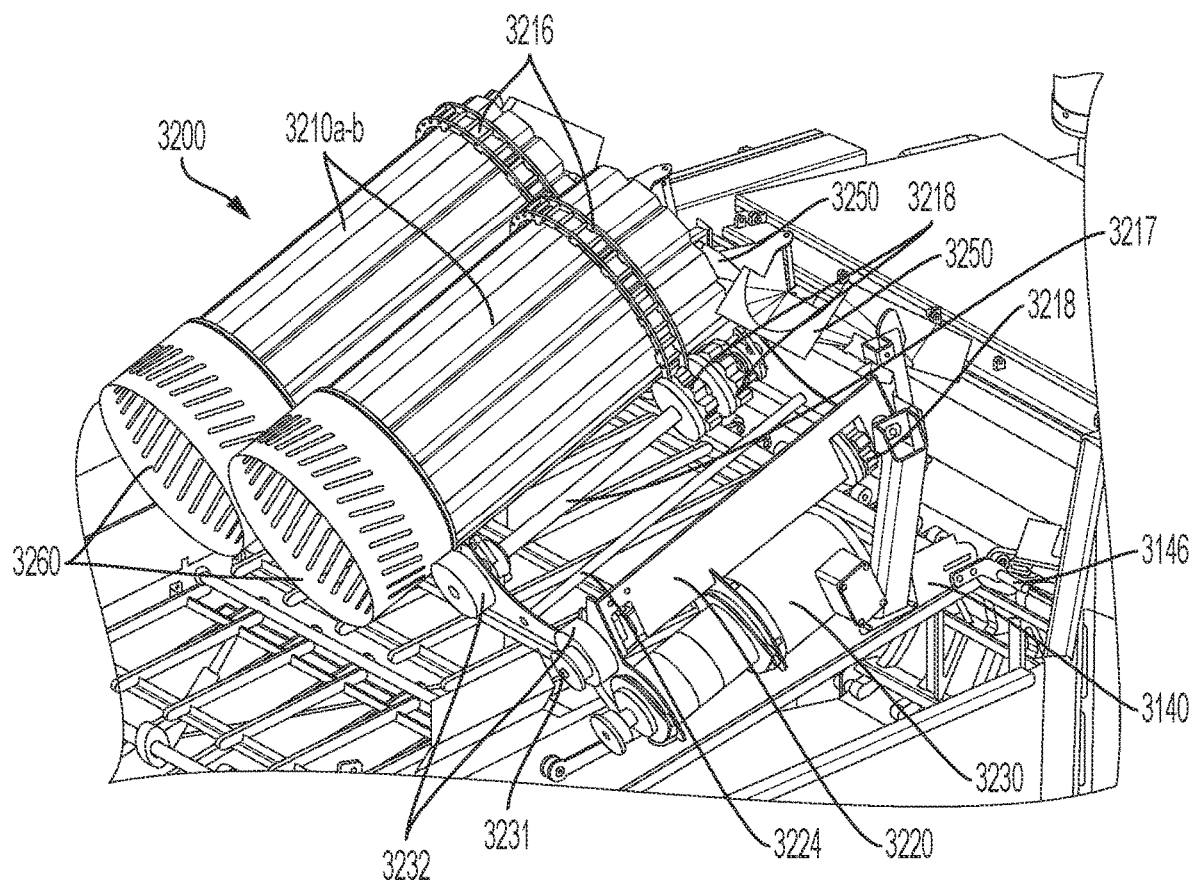
FIG. 6 is a left perspective view of an embodiment of a drum assembly and motor assembly to be used with the breading machine of FIG. 3.

As shown in FIGS. 5 and 6, the drum motor 3230 engages the drums 3210*a*-*c* via a series of tracks 3216 attached to the drum front ends 3212 and sprockets 3218. The sprockets 3218 are operatively attached by a shaft 3217 to wheels 3232, as shown in FIG. 6, and connected to the drum assembly frame 3220. The drum motor 3230 engages the drive wheel 3231 which in turn drives the sprockets 3218. Sprockets 3218 engage tracks 3216 such that drums 3210 are rotated. In some embodiments, the tracks 3216 are offset such that each track 3216 engages two sprockets 3218. Other suitable mechanisms for driving the rotary drums 3210 are contemplated, for example, belts and gears and friction wheels.

As shown in FIGS. 5 and 6, the wheels 3232 contact and support the drum back end 3214. According to FIG. 6, there are four wheels 3232 (two not shown) in the drum assembly 3200 with each drum 3210 contacting and supported by and between two wheels 3232. The two middle wheels of the four wheels 3232 contact two drums while the two outer most wheels contact each contact a single drum.

The number of drums 3210 in the drum assembly 3200 may vary, and, as such, the combination of drums 3210*a*-*c*, wheels 3232, and sprockets 3218 may vary in other embodiments. It is desirable, however, that the drums 3210*a*-*c*, or series of drums 3210*a*-*c*, substantially span the width of the main conveyor 3130. This is to ensure all food product and coating material is transferred from the second main conveyor end 3134 into either one of the drum front ends 3212 of the drums 3210*a*-*c*. As such, the drum motor 3230 may drive multiple rotatable drums 3210*a*-*c* along the individual drum's longitudinal axis. In some embodiments, the motor may drive the drums 3210*a*-*c* in the same or different direction depending on how the motor engages the series of motors. That is, various gear ratios or belt combinations may produce different directional rotations.

Figure 1A:
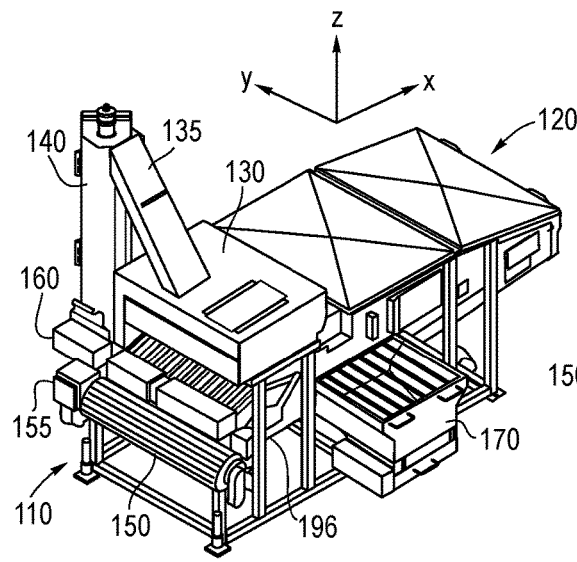
FIGS. 1A-D are perspective front side, top, and side views, respectively, of a first embodiment of a known breading machine.
Figure 1C:
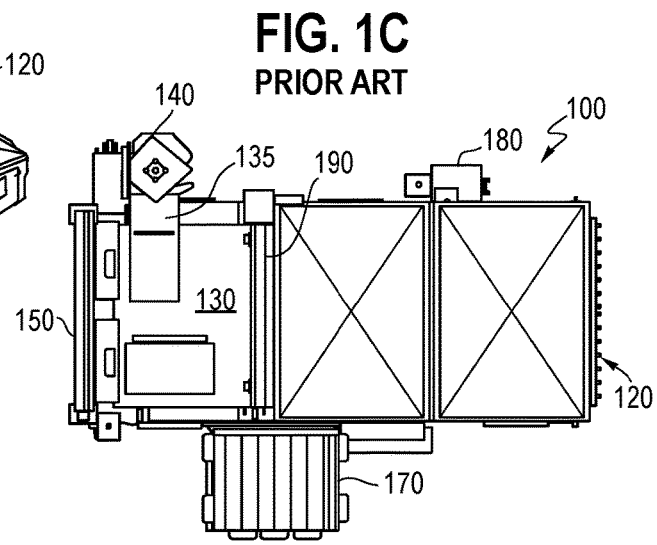
Figure 1B:
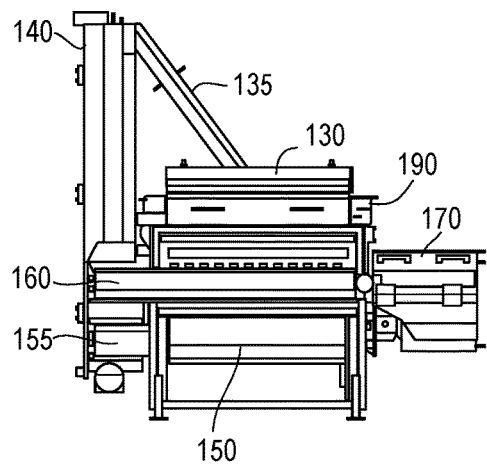
Figure 1D:
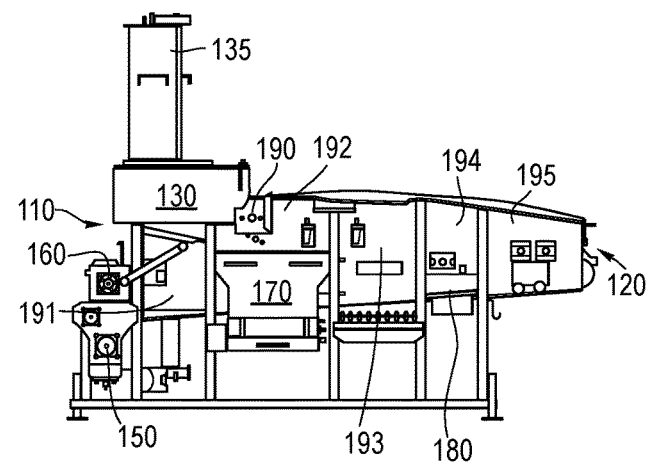
Figure 2A:
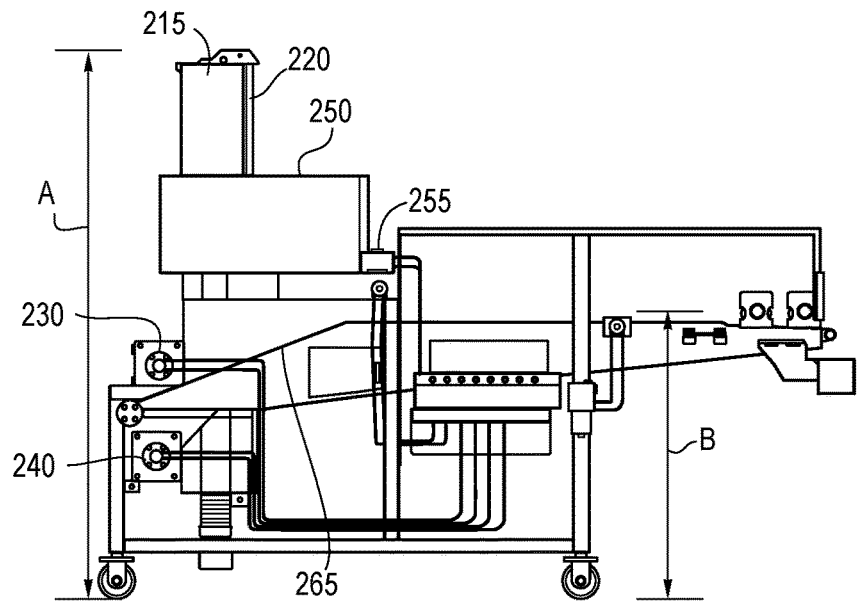
FIGS. 2A-B are side and top views, respectively, of a second embodiment of a known breading machine.
Figure 2B:
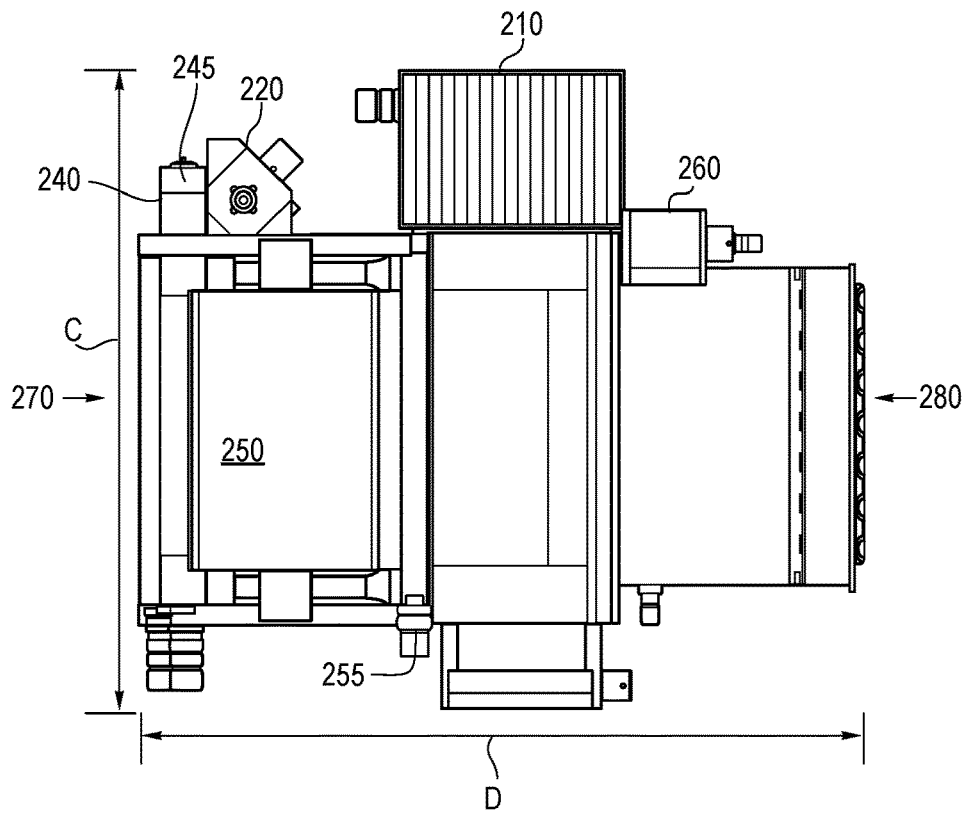
Figure 7:
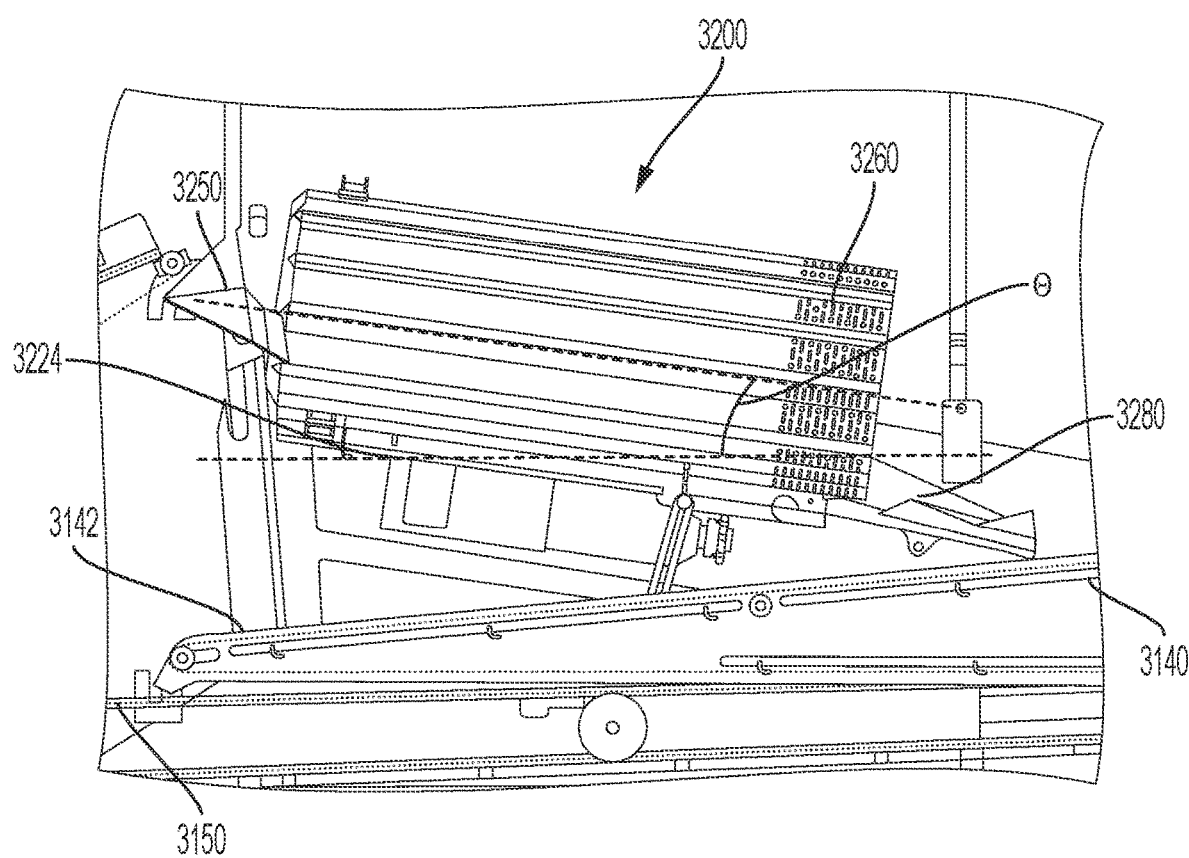
FIG. 7 is a side cross-sectional view of an embodiment of a drum assembly to be used with the breading machine of FIG. 4.

In another embodiment, the drum assembly 3200 may be pivoted in a plane perpendicular to the x-y plane defined in FIG. 1A so that the drum assembly 3200 pivots toward or away from the x-y plane of FIG. 1A. The drum assembly may be pivoted between 3 and 13 degrees measured from the drum longitudinal axis and the x-y plane defined by the angle $\Theta$, as shown in FIG. 7. It is contemplated that other ranges of angles suitable for coating food product can be used, like between 0 and 15 degrees.

A pivoting assembly 3240 may include an actuator 3241 and a linkage 3242 attached to the outfeed conveyor 3140 and the drum assembly frame 3220, as shown in FIG. 5. In FIG. 5, the actuator 3241 is attached to the linkage 3242. The linkage 3242 has a sliding link 3244 and a slotted link 3246 wherein the sliding link 3244 is attached to the actuator 3241 and a transmitting shaft 3245 (not shown). The slotted link 3246 is attached to the drum frame 3220 to support the movement of the drum assembly 3200.

The transmitting shaft 3245 transmits the movement of link 3244 to a drum frame support 3224, shown in FIG. 6.

Consequently, when the sliding link 3244 is actuated, the drum frame support 3224 pivots the back end of the drum assembly frame 3220 about a pivot point 3248 of the pivoting assembly 3240 located near the front end of the drum assembly frame 3220. In other embodiments, the linkage 3242 can be manually adjusted using a crank. In some embodiments, the linkage 3242 may be a bell crank linkage. The pivot point 3248 may be a pin, screw, bolt, or any other suitable object to support pivoting.

Other suitable pivoting assemblies contemplated for pivoting or tilting the pivoting assembly 3240 may include a pneumatic system, a hydraulic system, a piston, mechanically cranking system, or other suitable mechanisms for use with food products. The drum assembly 320X) may also be manually pivoted to the desired angle. In other embodiments, the drum assembly 3200 may be pivoted about a pivot point 3248 located at another suitable location on the drum assembly frame 3220, for example, the drum back end 3214.

Figure 9:
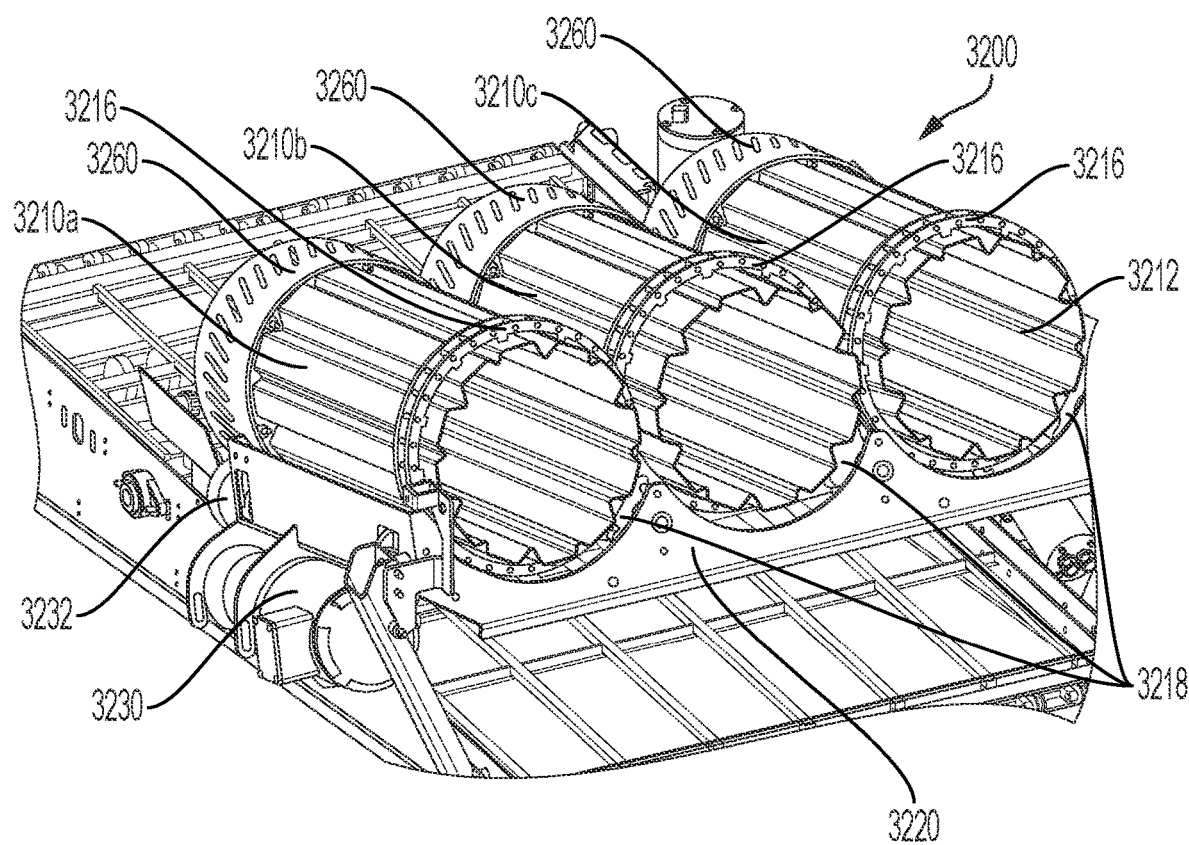
FIG. 9 is a front perspective view of the drum assembly of FIG. 6.
Figure 11:
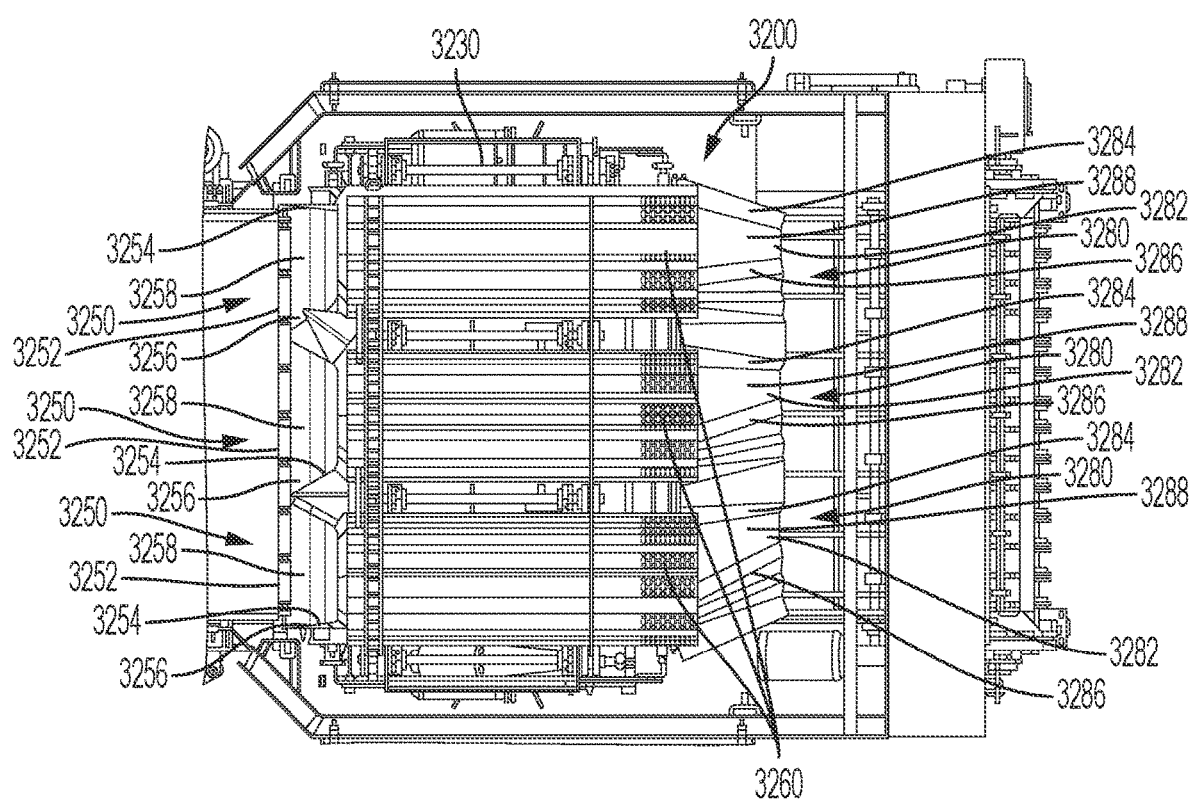
FIG. 11 is a top cross-sectional view of the breading machine of FIG. 3.

The drum assembly 3200 includes adapters like an infeed chute 3250 and/or an outfeed chute 3260, as shown in FIG. 11. When the adjustable breading machine 3000 is operating in drum mode, the infeed chute 3250 is designed to efficiently transfer the food product and coating material from the main conveyor 3130 into each of the drum front ends 3212. The infeed chute 3250 is attached to the drum assembly frame 3220 and is substantially disposed in the food path between the second main conveyor end 3134 and the drum front ends 3212. In some embodiments that include multiple drums 3210, there will be corresponding infeed chutes 3250 for each drum 3210. As shown in FIG. 9, the infeed chutes 3250 may also be formed as individual chutes welded together at or near sidewalls 3254, 3256 so as to form a single infeed chute. It is contemplated that multiple infeed chutes 3250 may be formed separately or from a single structure having several infeed chutes 3250. In other embodiments, the infeed chutes 3250 may be formed into a single piece by welding multiple pieces.

As shown in FIG. 5, the infeed chute 3250 has a straight-edged front side 3252 that substantially abuts the second main conveyor end 3134 and spans the width of the main conveyor 3130. If there are multiple infeed chutes 3250, as shown in FIG. 11, the infeed chute front sides 3252, when aligned next to another, will span the width of the main conveyor 3130. The infeed chute 3250 also includes infeed sidewalls 3254, 3256 that together with the front side 3252 form an infeed chute channel 3258 that funnels the food product and coating material into the drum front ends 3212. The sidewalls 3254 and 3256 can be fabricated into any suitable shape for funneling materials, for example, the sidewalls may be bent, curved, or rolled. In some embodiments, the infeed chute channel 3258 is wider near the second main conveyor end 3134 than near the drum front ends 3212.

As shown in FIG. 6, the infeed chute 3250 is rotatable such that when adjusting the adjustable breading machine 3000 between flat mode and drum mode, or vice versa, the infeed chute 3250 rotates in a vertical plane to move from one mode to another mode without contacting the infeed chute 3250 with another component of the adjustable breading machine 3000. As shown in FIG. 4, the infeed chute 3250 may rotate about a pin operatively attached to the drum assembly frame 3220. It is contemplated that the infeed chute 3250 can be rotated manually using a T-handle or using another suitable mechanism, manually or automatically.

Figure 8:
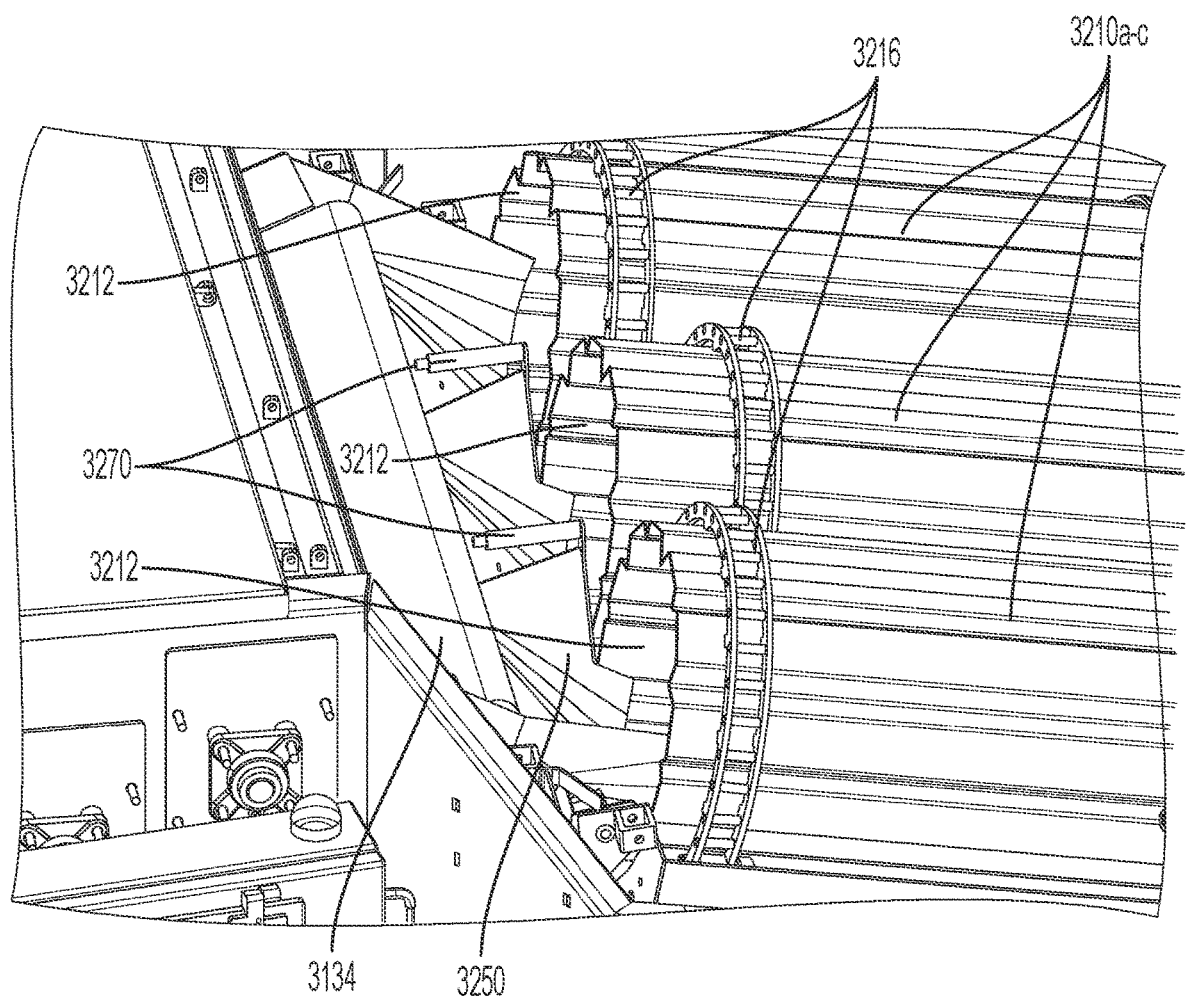
FIG. 8 is a right perspective view of an embodiment of an infeed chute to be used with the drum assembly of FIG. 5.

As shown in FIG. 8, rollers 3270 may be disposed between infeed chutes 3250. The rollers 3270 may be formed from a pin and ball bearing assembly so as to naturally rotate when contacted by food product or coating material. In other embodiments, the rollers 3270 be mechanically- or electronically-driven. Likewise, in some embodiments, the rollers 3270 may form other suitable geometries for biasing unused coating material, for example, a sphere or a cone. The rollers 3270 serve as a biasing mechanism forcing unused coating material or food product into the infeed chutes 3250 on either side of the roller 3270. The rollers 3270 prevent unused coating material and food product from clogging the infeed chutes 3250 and drums 3210.

Figure 10:
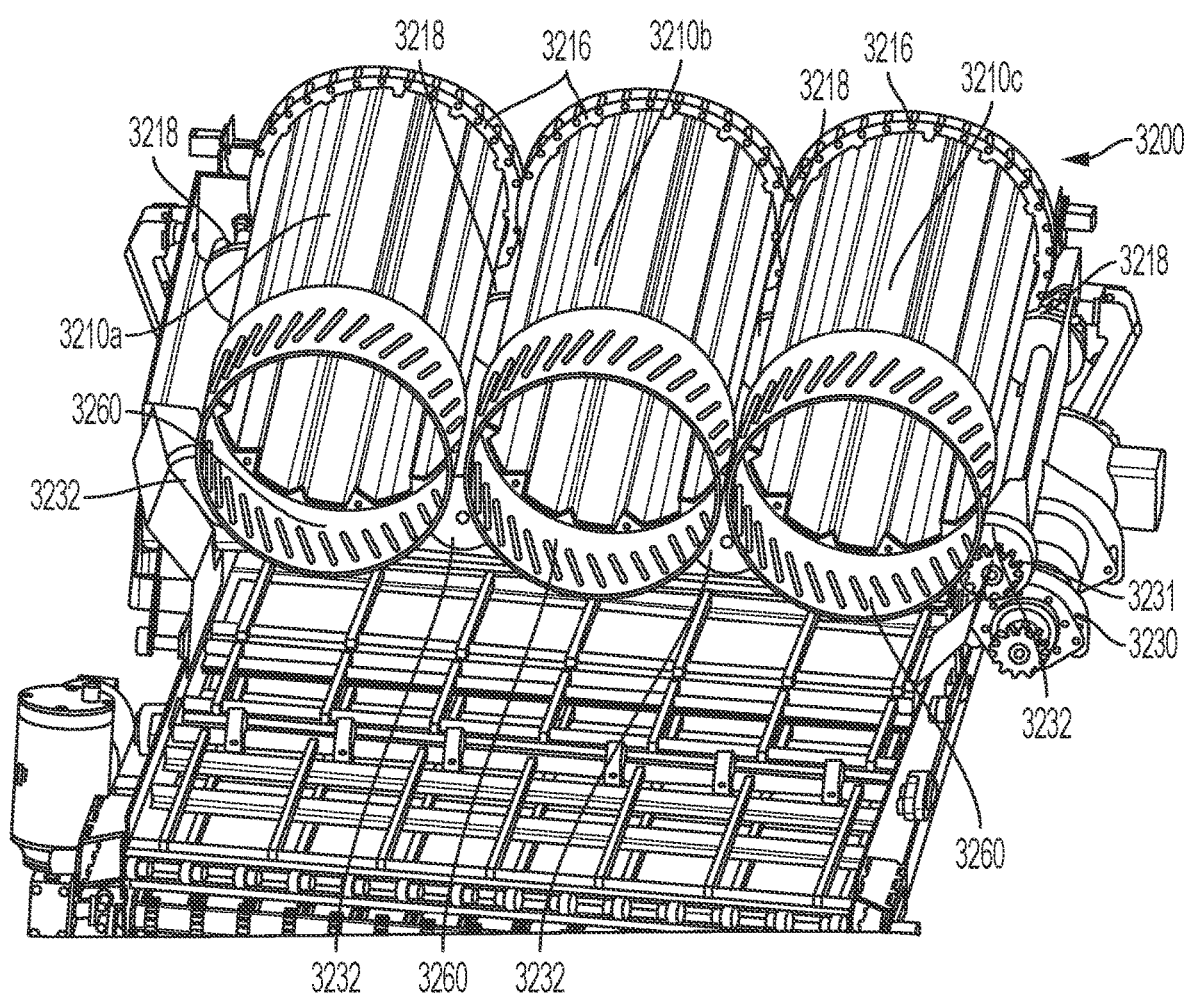
FIG. 10 is a rear perspective view of the drum assembly of FIG. 6.

The outfeed chute 3260 is designed to efficiently transfer the food product and coating material from the drum back end 3214 to the outfeed conveyor 3140. As shown in FIG. 10, the outfeed chute 3260 for each drum 3210a-c is fixedly attached to the drum 3210 and is substantially disposed in the food path between the drum back end 3214 and the outfeed conveyor 3140. The outfeed chute 3260 may be bolted to the drum 3210. The advantage of being bolted onto the drum 3210 is that the outfeed chute 3260 is easily interchangeable with other suitable adapters.

There are corresponding outfeed chutes 3260 for each drum 3210a-c, as shown in FIG. 10. It is contemplated that multiple outfeed chutes 3260 may be formed separately or from a single structure having several outfeed chutes 3260.

As shown in FIG. 10, the outfeed chute 3260 is a cylindrical attachment designed to sift unused coating material. The outfeed chute 3260 may include slots through which coating material may pass. It is contemplated, however, that other suitable patterns for filtering excess coating material may be used, including variations in size, shape, and quantity. Alternatively, the outfeed chute 3260 may have a smooth inner surface with no openings to facilitate the transfer of food product to the outfeed conveyor 3140. When a food product contacts a smooth surface upon exiting the drum back end 3214, the food product is biased toward sliding to the base of the outfeed chute 3260 such that the food product slides onto the outfeed conveyor 3140 instead of potentially falling out of the drum 3210 onto the conveyor 3140. Due to the interchangeability of the outfeed chutes 3260 using bolts or a like fastener, it is contemplated that the length of the outfeed chutes 3260 can be extended or shortened depending on the preferences of the user.

As shown in FIGS. 7 and 11, the outfeed chute 3260 may include an extension chute 3280 having a back edge 3282 that substantially abuts the drum back end 3214 and spans the width of the drum 3210 as shown in FIG. 11. As shown in FIG. 11, the outfeed chute back sides 3282, when aligned next to another, will span the width of the drums 3210. The extension chute 3280 also includes outfeed sidewalls 3284, 3286 that together with a bottom surface 3281 form an extension chute channel 3288 that funnels the food product and coating material onto the outfeed conveyor 3140. The sidewalls 3284 and 3286 can be fabricated into any suitable shape for funneling materials, for example, the sidewalls may be bent, angled, curved, or rolled. In some embodiments, the extension chute channel 3288 is wider near the drum back end 3214 than near the outfeed conveyor 3140.

As shown in FIG. 4, when the adjustable breading machine 3000 is operating in drum mode, the food product and coating material will transfer from the second main conveyor end 3134 to the drum front end 3212. For shifting the adjustable breading machine 3000 between flat mode and drum mode, the adjustable breading machine 3000 includes a drum adjustment assembly 3300. In the embodiment shown in FIG. 12A, the drum adjustment assembly 3300 includes a top hook 3310 attached to the breading machine frame and adjacent to a top slot 3312 in the frame and a bottom hook 3320 attached to the frame and adjacent to a bottom slot 3322 in the frame. The drum adjustment assembly 3300 also includes an actuable bar 3330 connecting top hook 3310 and bottom hook 3320.

Figure 12A:
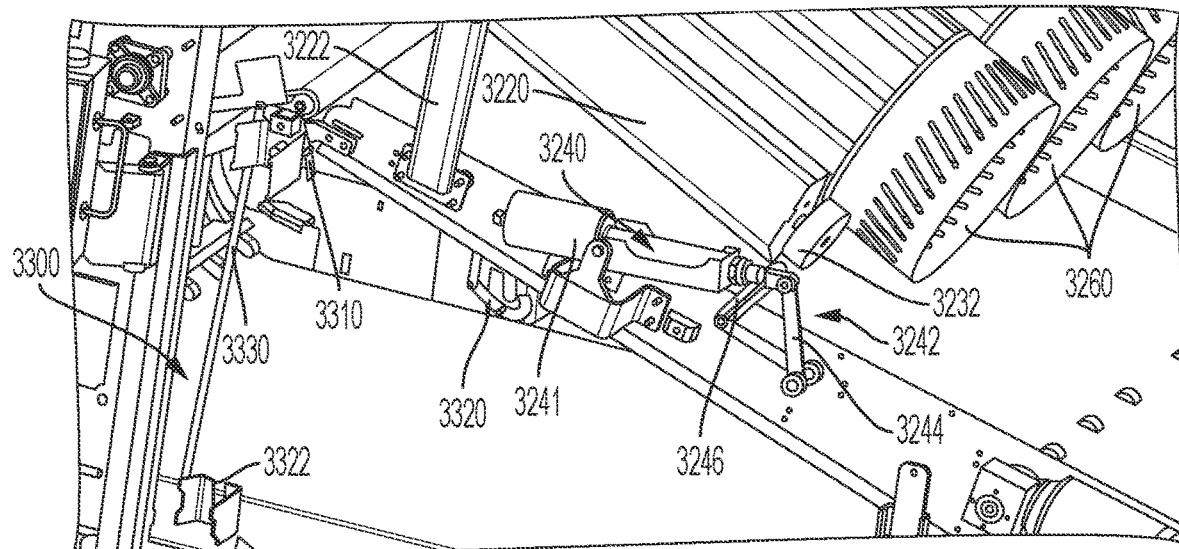
FIGS. 12A-B are perspective views of an embodiment of a drum adjustment assembly to be used in the breading machine of FIG. 3 when in the flat mode and the drum mode, respectively.

As shown in FIG. 12A, the top slot 3312 is located in the breading machine frame near the second main conveyor end 3134 such that when an adjustment pin 3146 attached to the first outfeed conveyor end 3142 engages the top slot 3312, the adjustment pin 3146 will rest in top slot 3312. The actuable bar 3330 is then actuated to secure the adjustment pin 3146 into slot 3312 using top hook 3310. At that point, the breading machine 3000 is in flat mode.

Figure 12B:
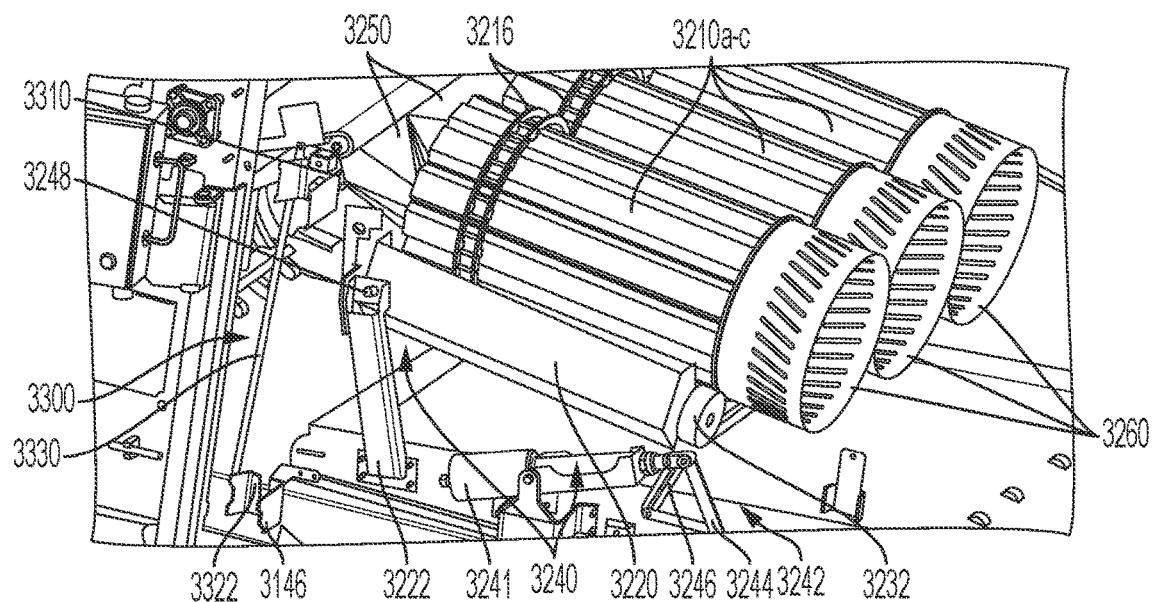

To change the operation mode from flat mode to drum mode, the actuable bar 3330 must be actuated such that the top hook 3310 disengages the adjustment pin 3146. Once disengaged, the adjustment pin 3146, along with outfeed conveyor 3140, may be rotated about an outfeed pivot pin 3148 located at the second outfeed conveyor end 3144. As shown in FIG. 12B, the outfeed conveyor 3140 may be adjusted downward until the adjustment pin 3146 engages the bottom slot 3322. After adjustment pin 3146 engages the bottom slot 3322, the actuable bar 3330 is actuated such that bottom hook 3320 secures the adjustment pin 3146 in drum mode.

Figure 13:
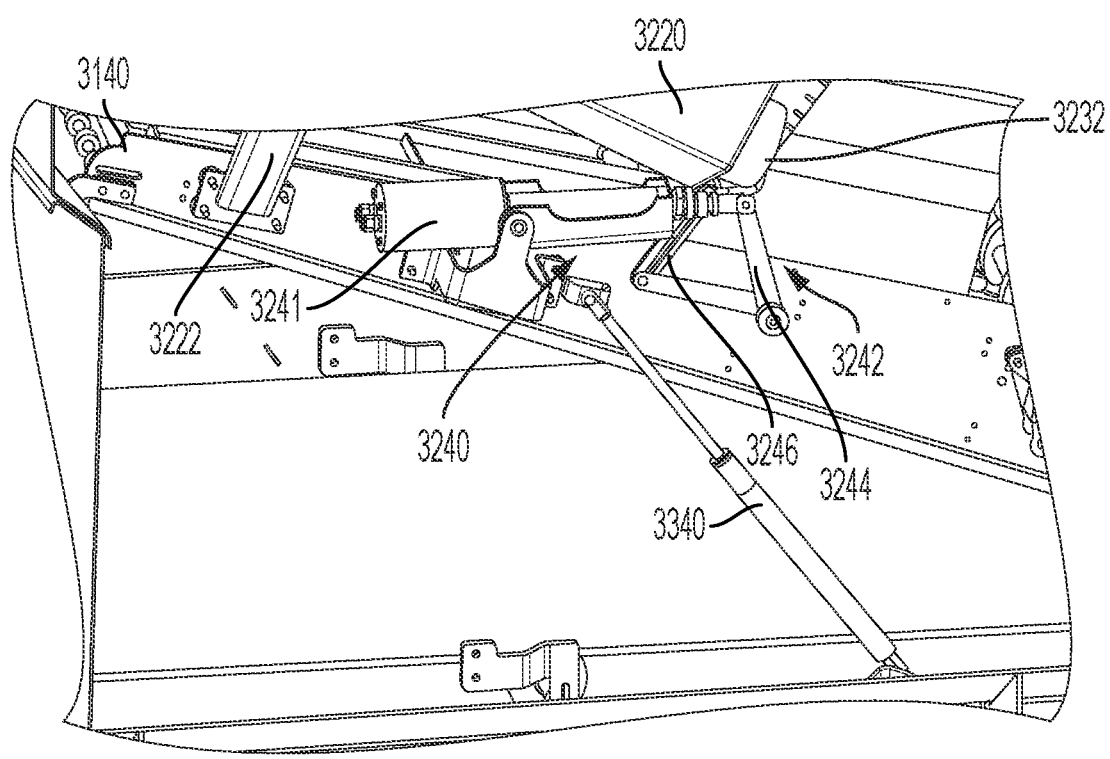
FIG. 13 is a perspective view of an embodiment of a drum adjustment support of the drum adjustment assembly of FIGS. 12A-B when in flat mode.

In other embodiments, the drum adjustment assembly 3300 may be automatically or manually adjusted. An automatic adjustment mechanism suitable for use in with food products may include, for example, a pneumatic system or a piston-driven system. As shown in FIG. 13, the drum adjustment assembly 3300 may further include an adjustment assistance mechanism 3340, like a compression spring or another suitable tension support member, to bear some of the weight of the outfeed conveyor 3140 as it is adjusted from one mode to another mode. In the embodiment shown in FIG. 13, the adjustment assistance mechanism 3340 is attached to the outfeed conveyor 3140 at its top end and the frame of the breading machine at its bottom end.

The operation and functionality of components capable of being used with the breading machine 3000 are described in U.S. Patent Publication No. 2007/0264397 by Mather et al, titled BREADING MACHINE AND METHODS OF OPERATION and incorporated herein by reference. The components, and embodiments thereof, described in U.S. Patent Publication No. 2007/0264397, include without limitation a side-mounted feed hopper, a top-mounted feed hopper, an auger assembly, a spreading or sprinkling assembly, a filter assembly, a vibrator, compression rollers, in-line belt tensioning assembly, hinged auger guards, and a double vertical transfer auger system. The use of the components described in U.S. Patent Publication No. 2007/0264397 have been contemplated herein with the present invention.

The present disclosure contemplates a method for operating adjustable breading machines such as those previously described. The food product may be fed into the input side 110 of the adjustable breading machine 3000. In some embodiments, the food product can be fed directly into the breading machine 3000. However, it is contemplated that the food product can be into the input side 110 after exiting another machine, for example, after being battered. To assure the main conveyor 3130 is covered with coating material, a feed hopper 3030, similar to the hopper described in U.S. Patent Publication No. 2007/0264397, the entire contents of which are incorporated herein by reference, meters coating material, like breadcrumbs, onto the main conveyor. The coating material is spread onto the main conveyor from a screw auger and/or a top-mounted hopper. As a result, the food product is covered in coating material.

Once the food product has entered the breading machine 3000, the food product will continue in an upward trajectory on the main conveyor 3130 until it reaches the second end of the main conveyor 3134. At that juncture, if the adjustable breading machine 3000 is operating in a first mode, called flat mode, the food product will transfer to the outfeed conveyor 3140. While being carried on the outfeed conveyor 3140, unused coating material can be filtered through the upper path of the outfeed conveyor 3140. To facilitate the filtering of unused coating material, in some embodiments a vibrator, as described in U.S. Patent Publication No. 2007/0264397 and incorporated by reference herein, may be included along the outfeed conveyor 3140. Not only can the vibrator break up or loosen excess coating material, the vibrator, together with the outfeed conveyor 3140 may also remove parts of food products that have broken off the main food products and have fallen through the main conveyor belt and onto the vibrating outfeed conveyor assembly.

In some embodiments, after the unused coating materials passes through the outfeed conveyor 3140, it can be reintroduced into the main conveyor 3130 via a recirculation conveyor 3150 located beneath the outfeed conveyor 3140. As described in U.S. Patent Publ. 2007/0264397 and incorporated by reference herein, the recirculation convevor 3150 may carry the unused materials to a hopper and auger assembly near the input side 110 of the breading machine 3000. The method continues as new food products are introduced into the breading machine for coating.

If a user no longer wishes to operate the breading machine 3000 in flat mode, the user may adjust the breading machine to operate in a second mode, called drum mode. To switch to drum mode, the user may adjust the breading machine 3000 using a drum adjustment assembly 3300, as described herein, to lower the outfeed conveyor 3140 such that the drum assembly 3200 is substantially in the food path. The drum adjustment assembly 3300 may include an actuable bar 3330, capable of being actuated manually or automatically, attached to hooks 3310, 3320 at the ends of the actuable bar 3330. The actuable bar 3330 can be actuated to unlock the outfeed conveyor 3140 from flat mode, wherein the outfeed conveyor pin 3146 disengages a top slot 3312. Once the outfeed conveyor pin 3146 engages a bottom slot 3322, the actuable bar 3330 is actuated a second time to secure the outfeed conveyor pin 3146 with the bottom hook 3320. The adjustable breading machine 3000 is now in drum mode. A user may repeatedly adjust the breading machine 3000 from flat mode to drum mode, and vice versa, by actuating the drum adjustment assembly 3300 in the same manner just described. When adjusting from drum mode to flat mode, however, the drum assembly 3200 will move out of the food path and the outfeed conveyor 3140 will move substantially into the food path.

In drum mode, the main conveyor operates in the same manner as described above. When the food product reaches the second main conveyor end 3134, the food product and unused coating material will be transferred into the rotatable drums 3210 as described herein. The rotatable drums can carry and rotate the food product through the length of the drums providing additional coating, if necessary. The food product is then dispensed onto the outfeed conveyor 3140, and the food product continues to the end of the outfeed conveyor 3140 as described above. Similarly, the unused coated material that exits the drums 3210 can be filtered through the top of the outfeed conveyor 3140. In some embodiments, outfeed chutes 3260 can be attached to the drum assembly to help spread the food product evenly across the outfeed conveyor 3140. This can be done by actuating or positioning the outfeed chutes 3260 in a certain manner. In some embodiments, varying the length of the outfeed chute 3260 or the finish on the inner surface of the outfeed chute 3260 may spread the food product.

In summary, an improved breading machine is disclosed for coating food products with a coating material (e.g., flour, breadcrumbs, cracker meal). The improved breading machine includes an improved conveyor assembly, an improved drum assembly, and a drum adjustment assembly. All of the enhancements expand the functionality of the breading machine and improve the coating of food product within the breading machine.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An adjustable breading machine for applying a coating material onto a food product, the adjustable breading machine comprising:
    a frame;
    an enclosed breading chamber operatively connected to the frame;
    a main conveyor operatively received at least partially within the breading chamber, the main conveyor comprising a first main conveyor end and a second main conveyor end, wherein the main conveyor is adapted to move with respect to the breading chamber;
    a hopper fixedly connected to the frame to deliver a coating material into the breading chamber;
    an outfeed conveyor operatively received at least partially within the breading chamber, the outfeed conveyor comprising a first outfeed conveyor end and a second outfeed conveyor end, wherein the outfeed conveyor is adapted to move with respect to the breading chamber;
    a drum assembly operatively disposed above the outfeed conveyor, comprising a rotatable drum for transporting food product and coating material to the outfeed conveyor, wherein the rotatable drum is rotatable about a drum longitudinal axis;
    a drum adjustment assembly operatively connected to the frame for moving the drum assembly into and out of a food path,
    wherein the drum adjustment assembly pivotally moves about the second outfeed conveyor end.

2. The adjustable breading machine of claim 1, wherein the drum adjustment assembly comprises:
    a top hook attached to the frame and adjacent to a top slot in the frame;
   a bottom hook attached to the frame and adjacent to a bottom slot in the frame;
    an actuable bar connecting the top hook and the bottom hook to one another, wherein the actuable bar can be actuated to move the outfeed conveyor from a first mode, wherein a pin attached to the first outfeed conveyor end engages the bottom slot, to a second mode, wherein the pin attached to the first outfeed conveyor end engages the top slot.

3. The adjustable breading machine of claim 2, wherein the drum adjustment assembly further comprises a compression shock attached to the outfeed conveyor.

4. The adjustable breading machine of claim 1, wherein the rotatable drum comprises a ridge disposed on an inner drum surface that at least partially extends the drum longitudinal axis.

5. The adjustable breading machine of claim 2, wherein the drum assembly further comprises:
    an infeed chute disposed adjacent to a front end of the rotatable drum; and
    an outfeed chute disposed adjacent to a back end of the rotatable drum.

6. The adjustable breading machine of claim 1, wherein the rotatable drum can pivot such that the rotatable drum is oriented within the range of 3-13 degrees measured from the drum longitudinal axis to a horizontal position oriented along an x-axis direction.

7. The adjustable breading machine of claim 1, further comprising:
    a recirculation conveyor operatively connected to the frame and disposed below the outfeed conveyor, wherein the recirculation conveyor is adapted to recirculate excess coating material to the main conveyor.

8. The adjustable breading machine of claim 5, wherein the infeed chute is vertically rotatable.

9. The adjustable breading machine of claim 5, further comprising:
    a roller disposed next to the infeed chute, wherein the roller is adapted to bias coating material into the infeed chute.

10. The adjustable breading machine of claim 5, wherein the outfeed chute is adjustable such that the outfeed chute alters the food path.

11. The adjustable breading machine of claim 7, further comprising:
    a vibrator connected to the outfeed conveyor to distribute the excess coating material across a belt of the outfeed conveyor and onto a belt of the recirculation conveyor.

12. An adjustable breading machine for applying a coating material onto a food product, the adjustable breading machine comprising:
    a frame;
    an enclosed breading chamber operatively connected to the frame;
    a main conveyor operatively received at least partially within the breading chamber, the main conveyor comprising a first main conveyor end and a second main conveyor end, wherein the main conveyor is adapted to move with respect to the breading chamber;
    a hopper fixedly connected to the frame to deliver a coating material into the breading chamber;
    an outfeed conveyor operatively received at least partially within the breading chamber, the outfeed conveyor comprising a first outfeed conveyor end and a second outfeed conveyor end, wherein the outfeed conveyor is adapted to move with respect to the breading chamber;
    a drum assembly operatively disposed above the outfeed conveyor, comprising a rotatable drum for transporting food product and coating material to the outfeed conveyor, wherein the rotatable drum is rotatable about a drum longitudinal axis;
    a drum adjustment assembly operatively connected to the frame for moving the drum assembly into and out of a food path, wherein the rotatable drum can pivot such that the rotatable drum is oriented within the range of 3-13 degrees measured from the drum longitudinal axis to a horizontal position oriented along an x-axis direction.

13. The adjustable breading machine of claim 12, wherein the drum adjustment assembly comprises a top hook attached to the frame and adjacent to a top slot in the frame;
a bottom hook attached to the frame and adjacent to a bottom slot in the frame;
an actuable bar connecting the top hook and the bottom hook to one another, wherein the actuable bar can be actuated to move the outfeed conveyor from a first mode, wherein a pin attached to the first outfeed conveyor end engages the bottom slot, to a second mode, wherein the pin attached to the first outfeed conveyor end engages the top slot.

14. The adjustable breading machine of claim 12, further comprising a recirculation conveyor operatively connected to the frame and disposed below the outfeed conveyor, wherein the recirculation conveyor is adapted to recirculate excess coating material to the main conveyor.

15. The adjustable breading machine of claim 13, wherein the drum assembly further comprises:
an infeed chute disposed adjacent to a front end of the rotatable drum; and
an outfeed chute disposed adjacent to a back end of the rotatable drum.

16. The adjustable breading machine of claim 15, further comprising a roller disposed next to the infeed chute, wherein the roller is adapted to bias coating material into the infeed chute.

17. The adjustable breading machine of claim 15, wherein the outfeed chute is adjustable such that the outfeed chute alters the food path.

18. The adjustable breading machine of claim 13, wherein the drum adjustment assembly further comprises a compression shock attached to the outfeed conveyor.

19. An adjustable breading machine for applying a coating material onto a food product, the adjustable breading machine comprising:
a frame;
an enclosed breading chamber operatively connected to the frame;
a main conveyor operatively received at least partially within the breading chamber, the main conveyor comprising a first main conveyor end and a second main conveyor end, wherein the main conveyor is adapted to move with respect to the breading chamber;
a hopper fixedly connected to the frame to deliver a coating material into the breading chamber;
an outfeed conveyor operatively received at least partially within the breading chamber, the outfeed conveyor comprising a first outfeed conveyor end and a second outfeed conveyor end, wherein the outfeed conveyor is adapted to move with respect to the breading chamber;
a drum assembly operatively disposed above the outfeed conveyor, comprising a rotatable drum for transporting food product and coating material to the outfeed conveyor, wherein the rotatable drum is rotatable about a drum longitudinal axis;
a drum adjustment assembly operatively connected to the frame for moving the drum assembly into and out of a food path,
wherein the drum adjustment assembly pivotally moves about the second outfeed conveyor end,
wherein the drum adjustment assembly comprises:
a top hook attached to the frame and adjacent to a top slot in the frame;
a bottom hook attached to the frame and adjacent to a bottom slot in the frame;
an actuable bar connecting the top hook and the bottom hook to one another, wherein the actuable bar can be actuated to move the outfeed conveyor from a first mode, wherein a pin attached to the first outfeed conveyor end engages the bottom slot, to a second mode, wherein the pin attached to the first outfeed conveyor end engages the top slot, and
wherein the rotatable drum can pivot such that the rotatable drum is oriented within the range of 3-13 degrees measured from the drum longitudinal axis to a horizontal position oriented along an x-axis direction.

20. The adjustable breading machine of claim 19, wherein the drum adjustment assembly further comprises a compression shock attached to the outfeed conveyor, and an infeed chute disposed adjacent to a front end of the rotatable drum; and an outfeed chute disposed adjacent to a back end of the rotatable drum.

* * * * *